(12) United States Patent
Liang et al.

(10) Patent No.: US 7,742,241 B2
(45) Date of Patent: Jun. 22, 2010

(54) IMAGING LENS SYSTEM

(75) Inventors: Kuo-Yen Liang, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 7 days.

(21) Appl. No.: 12/202,329

(22) Filed: Sep. 1, 2008

(65) Prior Publication Data

US 2009/0268313 A1    Oct. 29, 2009

(30) Foreign Application Priority Data

Apr. 28, 2008    (CN) .................. 2008 1 0301324

(51) Int. Cl.
  *G02B 9/12*    (2006.01)
  *H04N 5/225*   (2006.01)
  *G02B 3/02*    (2006.01)

(52) U.S. Cl. .................. 359/791; 348/340; 359/716

(58) Field of Classification Search .................. 348/335, 348/340; 359/716, 784, 791
  See application file for complete search history.

(56) References Cited

U.S. PATENT DOCUMENTS

| 6,525,886 | B1 | 2/2003 | Lewis | |
|---|---|---|---|---|
| 7,460,315 | B1 * | 12/2008 | Cheng et al. | 359/784 |
| 7,508,601 | B2 * | 3/2009 | Murakami et al. | 359/791 |
| 7,636,207 | B2 * | 12/2009 | Hsu | 359/791 |
| 2010/0020419 | A1 * | 1/2010 | Liang et al. | 359/738 |

* cited by examiner

*Primary Examiner*—David N Spector
(74) *Attorney, Agent, or Firm*—Zhigang Ma

(57) ABSTRACT

An imaging lens system, in order from the object side to the image side thereof, includes a first lens with positive refractive power, a second lens with positive refractive power, a third lens with negative refractive power and an image sensing element. The imaging lens system satisfies the following formulas: $L/TTL>1.23$, and $0.3<G1R1/F1<0.4$, where an active surface of the image sensing element is square and only includes effective pixels, and L is the length of one side of the active surface, image sensing element TTL is the distance along an optical axis thereof from the object-side lens surface of the first lens to an imaging plane of the image side, G1R1 is the radius of curvature of the object-side lens surface of the first lens, and F1 is the focal length of the first lens.

11 Claims, 7 Drawing Sheets

IMAGING LENS SYSTEM

BACKGROUND

1. Technical Field

The invention relates to imaging lens systems and, particularly, to an imaging lens system having a high resolution and a short overall length.

2. Description of the Related Art

In order to obtain high image quality, small-sized camera modules for use in thin electronic devices, such as mobile phones, personal digital assistants (PDA), or webcams for personal computers, must have imaging lens systems with high resolution but short overall length (the distance between the object-side surface of the imaging lens and the imaging plane of the camera module). Factors affecting both the resolution and the overall length of the imaging lens system, such as the number and positions of lenses employed, the power distribution of the employed lenses, and the shape of each employed lens, complicate any attempt to increase resolutions and shorten overall lengths of imaging lenses. For example, reducing the number of lenses can shorten the overall length of an imaging lens system, but the resolution will suffer and, conversely, increasing the number of lenses can increase the resolution, but also increases the overall length of the imaging lens system.

Therefore, it is desirable to provide an imaging lens system which can overcome the abovementioned problems.

SUMMARY

An exemplary imaging lens system, in order from the object side to the image side thereof, includes a first lens with positive refractive power, a second lens with positive refractive power, a third lens with negative refractive power and an image sensing element. The imaging lens system satisfies the formulas L/TTL>1.23, and 0.3<G1R1/F1<0.4, where an active surface of the image sensing element is square and only includes effective pixels, and L is the length of one side of the active surface, TTL is the distance along an optical axis thereof from the object-side lens surface of the first lens to an imaging plane of an image sensing element, G1R1 is the radius of curvature of the object-side lens surface of the first lens, and F1 is the focal length of the first lens.

Other advantages and novel features will be more readily apparent from the following detailed description set forth below taken in conjunction with the accompanying drawings.

DETAILED DESCRIPTION OF THE PREFERRED EMBODIMENTS

Figure 1:
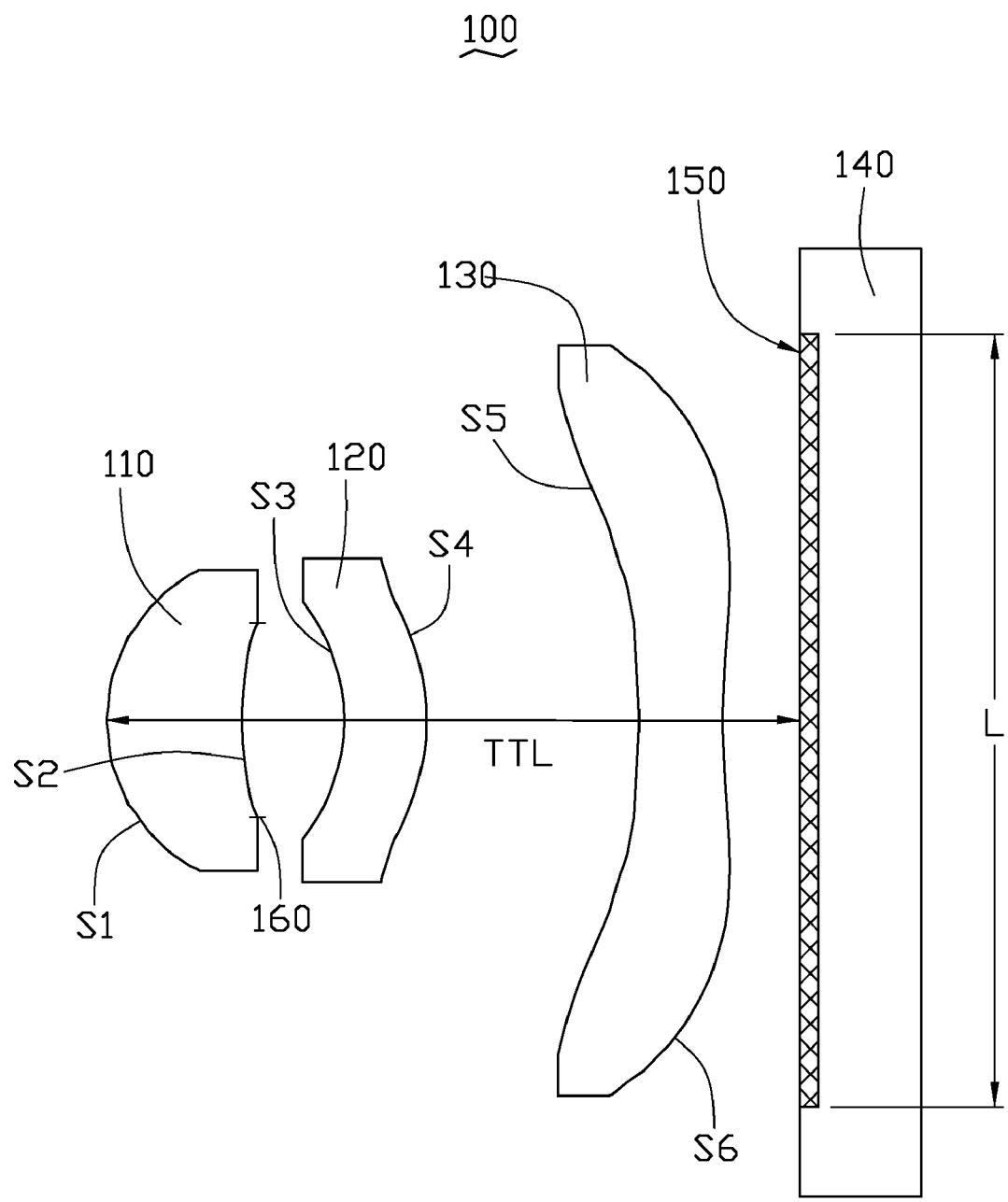
FIG. 1 is a schematic view of an imaging lens system in accordance with an embodiment.

Referring to FIG. 1, an imaging lens system 100 according to an embodiment, in order from the object side to the image side thereof, includes a first lens 110 with positive refractive power, a second lens 120 with positive refractive power, a third lens 130 with negative refractive power and a image sensing element 140. The first lens 110, second lens 120, and third lens 130 each have two opposite optical surfaces, and all optical surfaces of these lenses are referenced by symbols S1 to S6, in order from the object side to the image side of the imaging lens system.

Light refracted or radiated from an object enters into the imaging lens system 100, travels through the lenses 110, 120, 130, and converges on an active surface of the image sensing element 140 herein called an imaging plane 150.

In order to increase resolution and reduce the overall length of the imaging lens system 100, the imaging lens system 100 satisfies the following formulas: (a) L/TTL>1.23, (b) 0.3<G1R1/F1<0.4, where an active surface of the image sensing element 140 is square and only includes effective pixels, and L is the length of one side of the active surface, image sensing element TTL is the distance along an optical axis thereof from the object-side lens surface S1 of the first lens 110 to the imaging plane 150, G1R1 is the radius of curvature of the object-side lens surface S1 of the first lens 110, and the F1 is the focal length of the first lens 110.

Satisfying formula (a) helps miniaturize the overall length of the imaging lens system 100 to obtain a desirable and shortest possible overall length of the imaging lens system 100.

Satisfying formula (b) helps maintain balance between the overall length of the imaging lens system 100 and the spherical aberration as well as the cometic aberration of the imaging lens system 100 to obtain a preferable performance in imaging quality.

Preferably, along with satisfying formula (a) and (b) above, the imaging lens system 100 also satisfies the following formula: (c) 0.8<G1R2/F1<1.2, where the G1R2 is the radius of curvature of the image-side lens surface S2 of the first lens 10.

Satisfying formula (c) further helps to maintain balance between the overall length of the imaging lens system 100 and the spherical aberration as well as the cometic aberration of the imaging lens system 100. In addition, satisfying formula (c) helps miniaturize the overall length of the imaging lens system 100. Specifically, when G1R2/F1 is below the upper limit of 1.2, it is beneficial for reducing the overall length of the imaging lens system 100, and when G1R2/F1 is over the lower limit of 0.8, it is beneficial for controlling the curvature degree of the image-side lens surface S2 that can be grinded easily and inexpensively.

Moreover, along with satisfying formulas (a) and (b) or satisfying formulas (a), (b) and (c) above mentioned, it is preferable that the imaging lens system 100 further satisfies the following formula: (d) −0.1<G2R2/F2<G2R1/F2<−0.02, where G2R1 is the radius of curvature of the object-side lens surface S3 of the second lens 120, G2R2 is the radius of curvature of the image-side lens surface S4 of the second lens 120, and F2 is the focal length of the second lens 120.

Formula (d) is configured for optimizing the relationship between the two side lens surfaces S3, S4 of the second lens 120 to help miniaturize the overall length of the imaging lens system 100 and to maintain balance between the overall length of the imaging lens system 100 and the spherical and cometic aberrations thereof to obtain a preferable performance in imaging quality.

Furthermore, along with satisfying formulas (a) and (b) or satisfying formulas (a), (b), (c) and (d) above mentioned, it is preferable that the imaging lens system 100 satisfies the following formulas: (e) G3R1/F3<−1.5, (f) −1<G3R2/F3<−0.5, where G3R1 is the radius of curvature of the object-side lens surface S5 of the third lens 130, G3R2 is the radius of curvature of the image-side lens surface S6 of the third lens 130, and F3 is the focal length of the third lens 130.

Satisfying formulas (e) and (f) help maintain balance between the overall length of the imaging lens system 100 and the spherical and cometic aberrations thereof.

Along with satisfying formulas (a) and (b) above or satisfying formulas (a), (b), (c) and (d), in order to correct chromatic aberration occurring in the imaging lens system 100, the imaging lens system 100 needs to satisfy the following formulas: (g) Vd1>52, (h) Vd2<23, where V1 is the Abbe number of the first lens 110, and V2 is the Abbe number of the second lens 120.

An aperture stop 160 may be located before the first lens 110 adjacent to the object-side lens surface of the first lens 110 or behind the first lens 110 adjacent to the image-side lens surface of the first lens 110 to determine the cone angle of a bundle of rays that are focused in the imaging plane 150 and to prevent unwanted rays from striking the imaging plane 150 of the imaging lens 100.

The three lenses 110, 120, 130 are made from plastic to reduce the cost of the imaging lens system 100, and all have two aspherical surfaces (i.e., the aspherical object-side surface and the aspherical image-side surface) to efficiently correct aberrations. The aspherical surface is shaped according to the following formula:

$$x = \frac{ch^2}{1 + \sqrt{1 - (k+1)c^2 h^2}} + \sum A_i h^i,$$

where h is a height from the optical axis of the imaging lens system 100 to the aspherical surface, c is a vertex curvature, k is a conic constant, and Ai are i-th order correction coefficients of the aspheric surfaces.

Detailed examples of the imaging lens system 100 are given below with references to the accompanying drawings FIGS. 2-7, but it should be noted that the imaging lens system 100 is not limited to these examples. Listed below are the symbols used in the detailed examples:

R: radius of curvature;
D: distance between two adjacent lens surfaces along the optical axis of the imaging lens system 100;
Nd: refractive index of lens; and
V: Abbe constant.

When capturing an image, incident light enters into the imaging lens system 100, travelling through three lenses 110, 120, 130 as well as the aperture stop 160 and, finally, is focused onto the imaging plane 150 to form a visual image.

EXAMPLE 1

Tables 1, 2 show the lens data of Example 1.

TABLE 1

| Lens surfaces | R | D | nd | Vd |
|---|---|---|---|---|
| S1 | 0.98 | 0.61 | 1.53 | 56 |
| S2 | 2.26 | 0.07 | | |
| S3 | −1.17 | 0.37 | 1.585 | 30 |
| S4 | −1.24 | 0.96 | | |
| S5 | −10.00 | 0.38 | 1.53 | 56 |
| S6 | 3.84 | 0.35 | | |

Table 2 list the aspheric coefficients of the lens surfaces of the each lens.

TABLE 2

| aspheric co-efficients | Lens surfaces | | | | | |
|---|---|---|---|---|---|---|
| | S1 | S2 | S3 | S4 | S5 | S6 |
| A4 | −0.0297 | 0.0148 | −0.1782 | 0.0095 | −0.1613 | −0.1443 |
| A6 | −0.0035 | 0.0169 | 0.0473 | 0.0339 | 0.0872 | 0.0538 |
| A8 | −0.0282 | −0.1359 | −1.2170 | 0.3717 | −0.0180 | −0.0152 |
| A10 | −0.0333 | 0.6288 | 8.1281 | 0.0818 | 0.0015 | 0.0021 |
| A12 | −0.0211 | 0.0210 | −15.8921 | −0.3195 | −3.4E−05 | −0.0001 |

Figure 2:
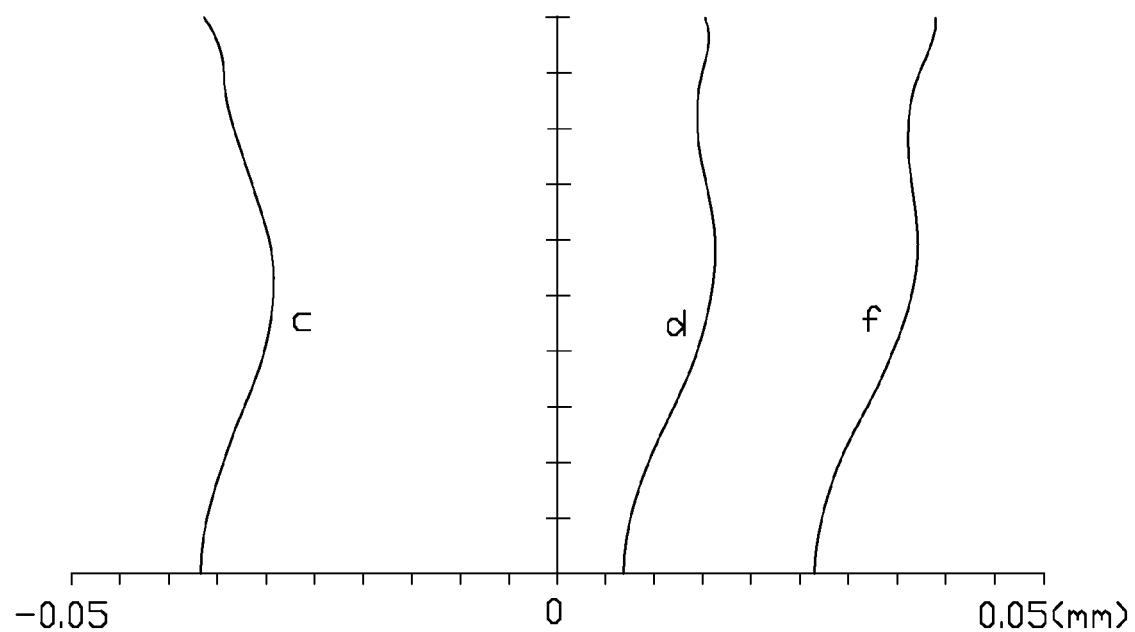
FIGS. 2-4 are graphs respectively showing spherical aberration, field curvature, and distortion occurring in the imaging lens system in accordance with a first exemplary embodiment.
Figure 3:
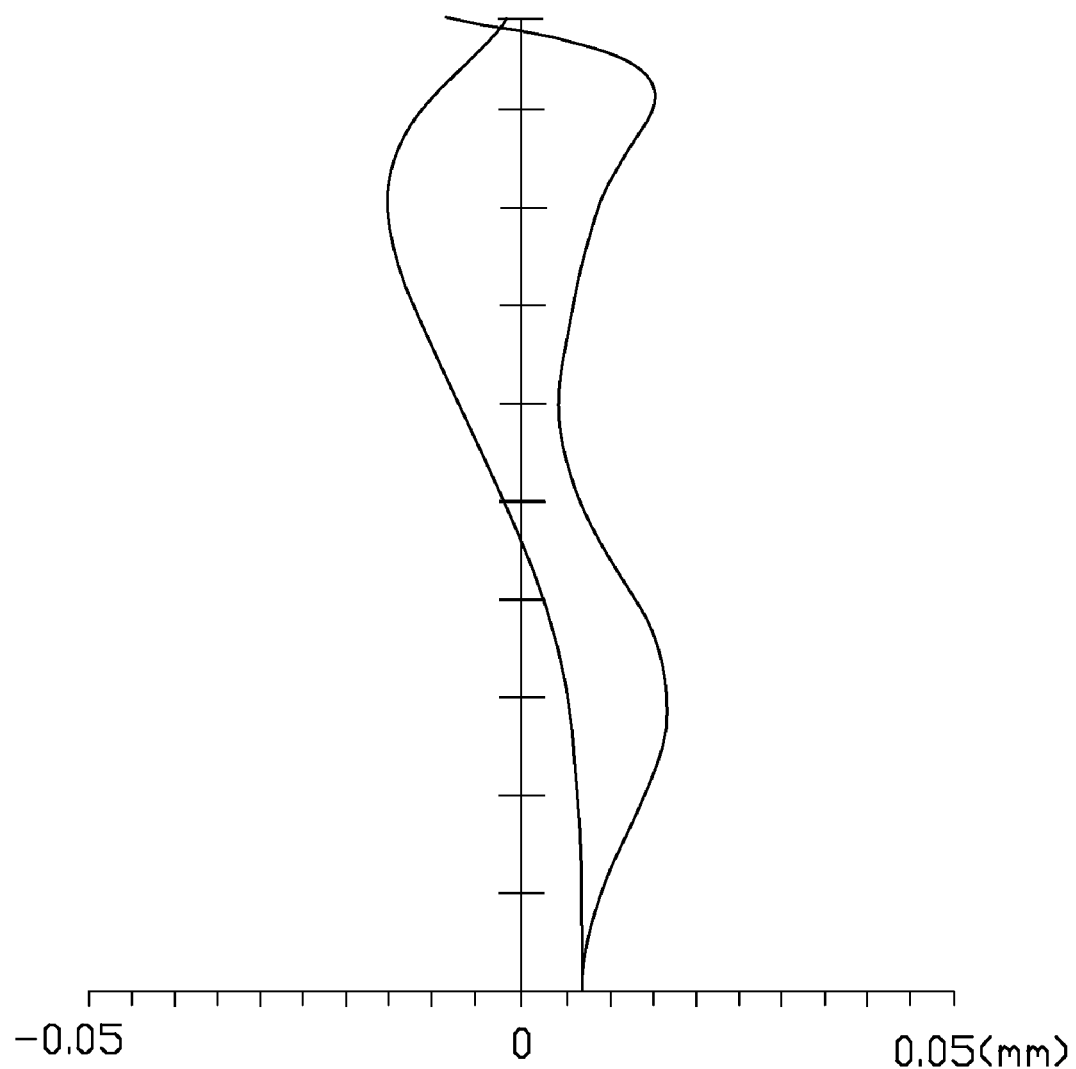
Figure 4:
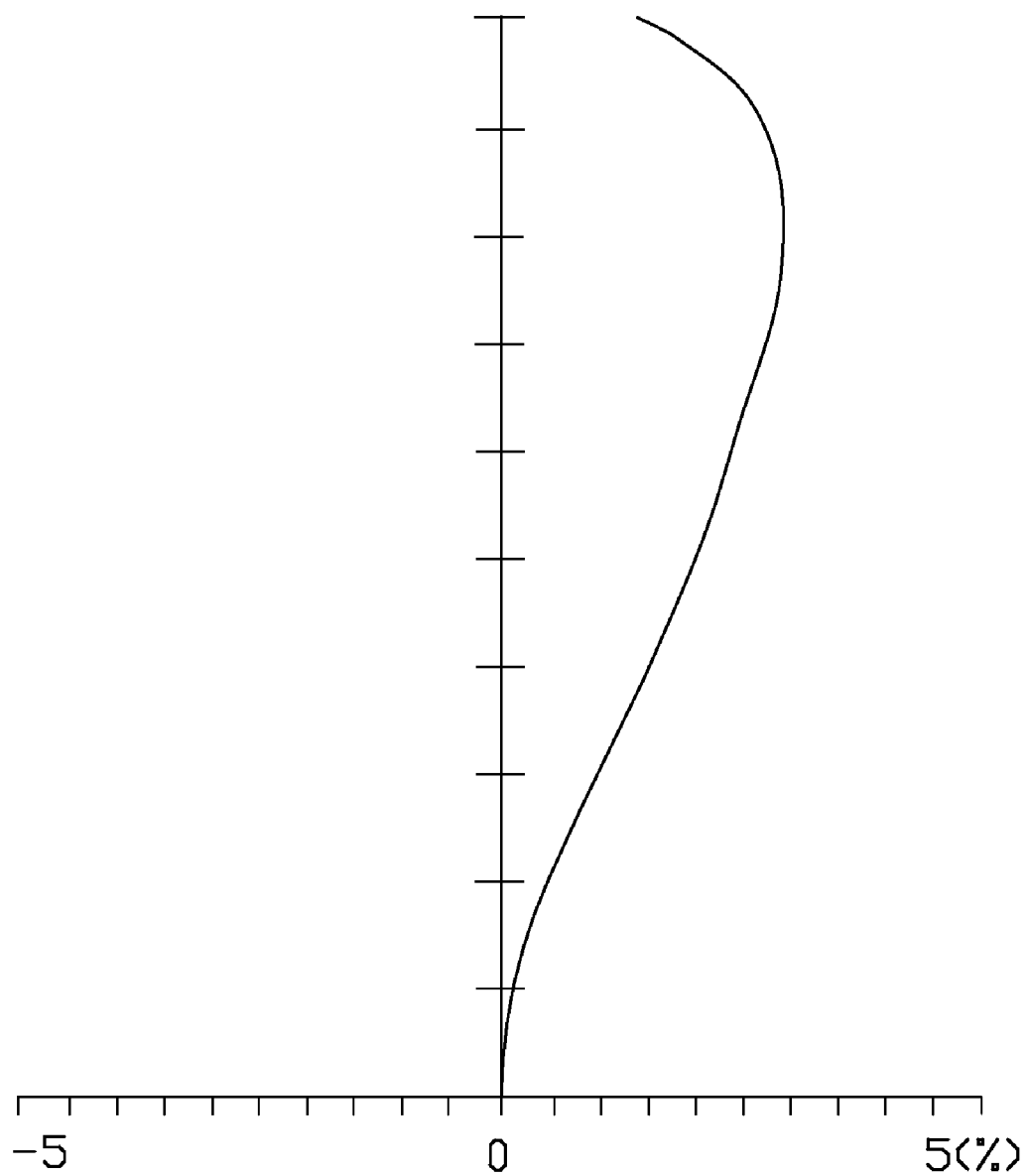

As illustrated in FIG. 2, the curves f, d, and c respectively indicate the spherical aberration characteristic curves of f light (wavelength: 486.1 nm), d light (587.6 nm), and c light (656.3 nm) when f, d and c light are respectively applied on the imaging lens 100 with the coefficients listed in Example 1. Spherical aberration occurring in the imaging lens system 100 of Example 1 approximately ranges from −0.05 mm to 0.05 mm. In FIG. 3, the curves t and s are the tangential field curvature curve and the sagittal field curvature curve, respectively. Clearly, field curvature occurring in the imaging lens 100 of Example 1 approximately ranges from −0.05 mm to 0.05 mm. In FIG. 4, distortion occurring in the imaging lens 100 of Example 1 is limited to range from −5% to 5%.

EXAMPLE 2

Tables 3, 4 show the lens data of Example 2.

TABLE 3

| Lens surfaces | R | D | nd | Vd |
|---|---|---|---|---|
| S1 | 0.98 | 0.59 | 1.543 | 56.8 |
| S2 | 2.05 | 0.08 | | |
| S3 | −1.22 | 0.38 | 1.585 | 30 |
| S4 | −1.26 | 1.05 | | |
| S5 | −10.00 | 0.32 | 1.515 | 57 |
| S6 | 4.05 | 0.35 | | |

Table 4 list the aspheric coefficients of the lens surfaces of the each lens

TABLE 4

| Aspheric coefficients | Lens surfaces | | | | | |
|---|---|---|---|---|---|---|
| | S1 | S2 | S3 | S4 | S5 | S6 |
| A4 | −0.0318 | 0.0044 | −0.1949 | −0.0006 | −0.1803 | −0.1529 |
| A6 | 0.0075 | −0.0565 | −0.0303 | −0.0176 | 0.0836 | 0.0530 |
| A8 | −0.0349 | −0.1291 | −1.2707 | 0.3407 | −0.0166 | −0.0147 |
| A10 | −0.0463 | 0.5642 | 8.7958 | 0.1384 | 0.0021 | 0.0021 |
| A12 | −0.0183 | −1.5272 | −17.7776 | −0.2671 | −0.0002 | −0.0002 |

Figure 5:
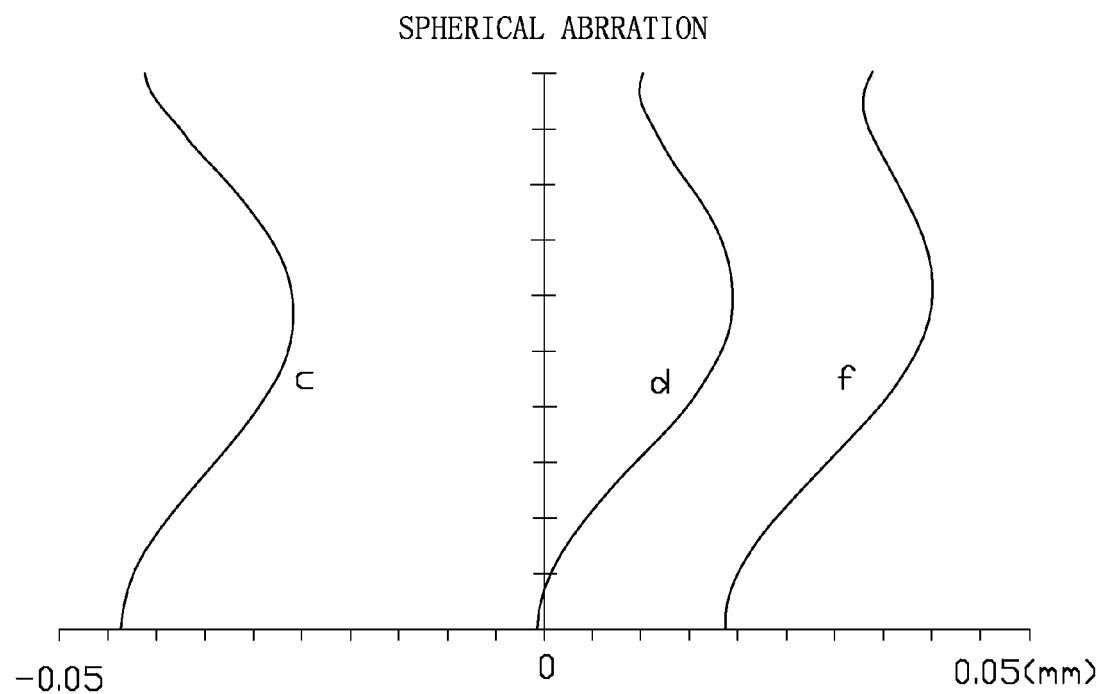
FIGS. 5-7 are graphs respectively showing spherical aberration, field curvature, and distortion occurring in the imaging lens system in accordance with a second exemplary embodiment.
Figure 6:
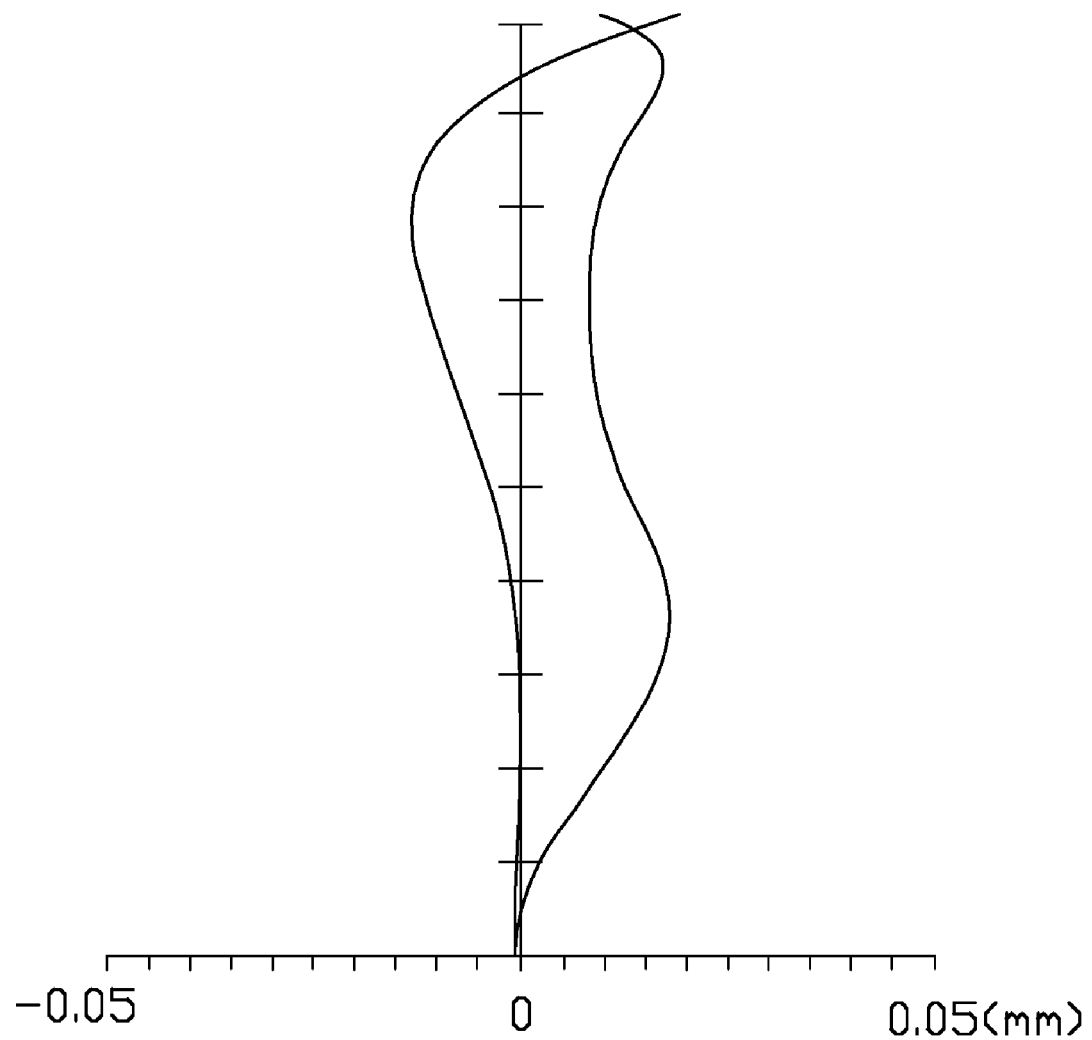
Figure 7:
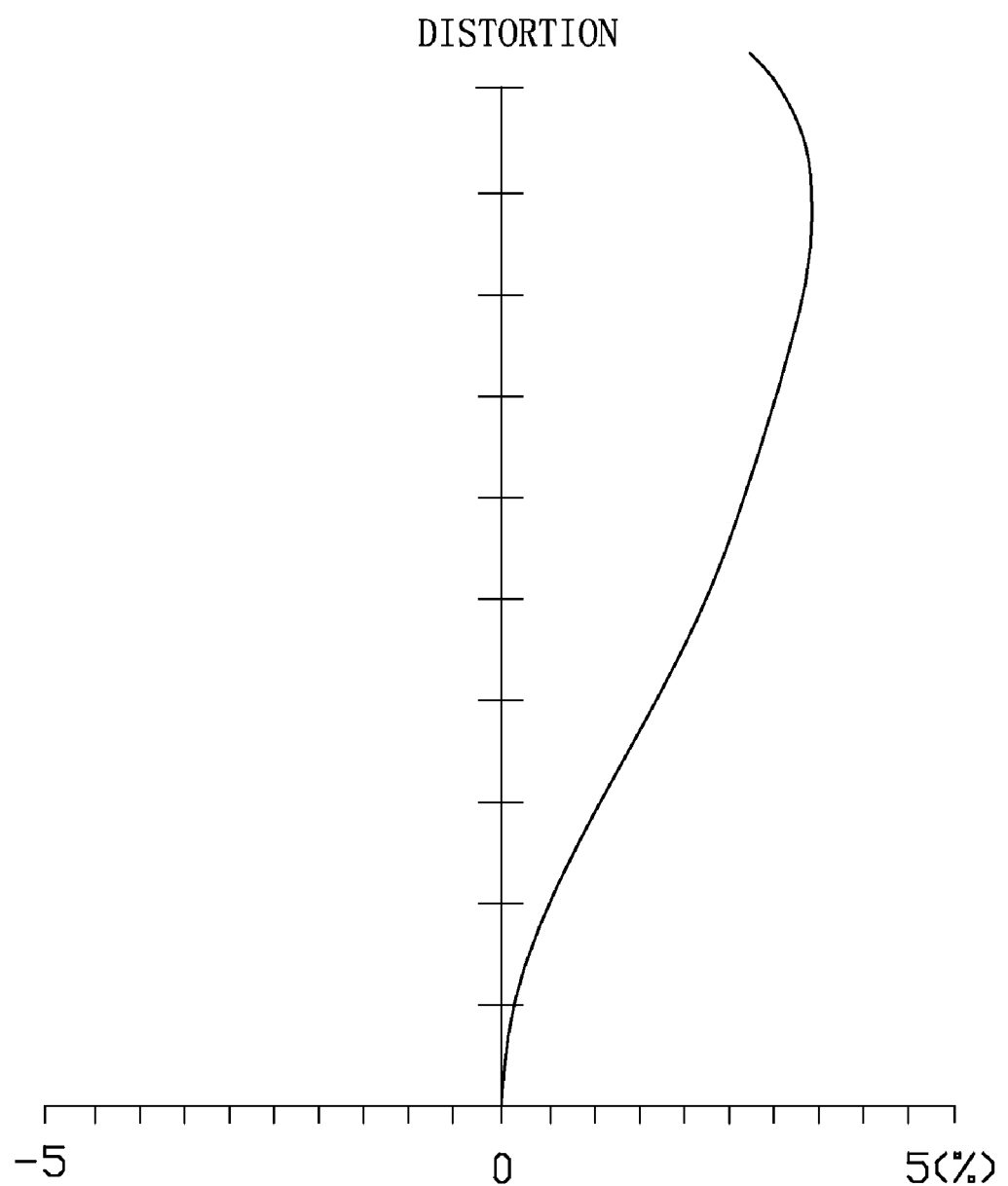

As illustrated in FIG. 5, spherical aberration occurring in imaging lens 100 of Example 2 approximately ranges from −0.05 mm to 0.05 mm. In FIG. 6, the field curvature occurring in the imaging lens 100 of Example 2 is limited to range from −0.05 mm to 0.05 mm. In FIG. 7, distortion occurring in the imaging lens 100 of Example 2 is limited to range from −5% to 5%.

Referring to the Examples 1, 2, although the overall length of the imaging lens 100 has been reduced, the resolution of the imaging lens 200 is maintained and improved since the aberration is controlled in an acceptable range.

It will be understood that the above particular embodiments are shown and described by way of illustration only.

The principles and the features of the present invention may be employed in various and numerous embodiments thereof without departing from the scope of the invention as claimed. The above-described embodiments illustrate the scope of the invention but do not restrict the scope of the invention.

What is claimed is:

1. An imaging lens system, in order from the object side to the image side, comprising a first lens with positive refractive power, a second lens with positive refractive power, a third lens with negative refractive power and a image sensing element, the imaging lens system satisfying the following formulas: L/TTL>1.23, 0.3<G1R1/F1<0.4, where an active surface of the image sensing element is square and only includes effective pixels, and L is the length of one side of the active surface, image sensing element TTL is the distance along an optical axis thereof from the object-side lens surface of the first lens to an imaging plane, G1R1 is the radius of curvature of the object-side lens surface of the first lens, and the F1 is the focal length of the first lens.

2. The imaging lens system as claimed in claim 1, wherein the imaging lens system further satisfies the following formula: 0.8<G1R2/F1<1.2, where the G1R2 is the radius of curvature of the image-side lens surface of the first lens.

3. The imaging lens system as claimed in claim 1, wherein the imaging lens system further satisfies the following formula: −0.1<G2R2/F2<G2R1/F2<−0.02, where G2R1 is the radius of curvature of the object-side lens surface of the second lens, G2R2 is the radius of curvature of the image-side lens surface of the second lens, and the F2 is the focal length of the second lens.

4. The imaging lens system as claimed in claim 1, wherein the imaging lens system further satisfies the following formula: G3R1/F3<−1.5, −1<G3R2/F3<−0.5, where G3R1 is the radius of curvature of the object-side lens surface of the third lens, G3R2 is the radius of curvature of the image-side lens surface of the third lens, and the F3 is the focal length of the third lens.

5. The imaging lens system as claimed in claim 1, wherein the imaging lens system further satisfies the following formula: Vd1>52, Vd2<23, where V1 is the Abbe number of the first lens 10, and V2 is the Abbe number of the second lens.

6. The imaging lens system as claimed in claim 1, wherein the imaging lens system further comprises an aperture stop, and the aperture stop is located before the first lens adjacent to the object lens surface of the first lens or behind the first lens adjacent to the imaging lens system surface of the first lens.

7. The imaging lens system as claimed in claim 1, wherein at least one of the first lens, the second lens, or the third lens is made of plastic material.

8. The imaging lens system as claimed in claim 1, wherein the first lens, the second lens, and the third lens each have two aspherical surfaces.

9. The imaging lens system as claimed in claim 2, wherein the imaging lens system further satisfies the following formula: −0.1<G2R2/F2<G2R1/F2<−0.02, where G2R1 is the radius of curvature of the object-side lens surface of the second lens, G2R2 is the radius of curvature of the image-side lens surface of the second lens, and the F2 is the focal length of the second lens.

10. The imaging lens system as claimed in claim 9, wherein the imaging lens system further satisfies the following formula: G3R1/F3<−1.5, −1<G3R2/F3<−0.5, where G3R1 is the radius of curvature of the object-side lens surface of the third lens, G3R2 is the radius of curvature of the image-side lens surface of the third lens, and the F3 is the focal length of the third lens.

11. The imaging lens system as claimed in claim 10, wherein the imaging lens system further satisfies the following formula: Vd1>52, Vd2<23, where V1 is the Abbe number of the first lens 10, and V2 is the Abbe number of the second lens.

* * * * *